RECORD CHANGER

Filed April 28, 1950 7 Sheets-Sheet 1

INVENTOR
EDWARD J. SPERBER
BY [signature]
ATTORNEY

Oct. 27, 1953 E. J. SPERBER 2,657,061

RECORD CHANGER

Filed April 28, 1950 7 Sheets-Sheet 2

Inventor

EDWARD J. SPERBER

By H. L. Newton

Attorney

Oct. 27, 1953 E. J. SPERBER 2,657,061

RECORD CHANGER

Filed April 28, 1950 7 Sheets-Sheet 3

Inventor
EDWARD J. SPERBER

By H. W. Newton

Attorney

INVENTOR
EDWARD J. SPERBER
BY H. L. Newton
ATTORNEY

INVENTOR
EDWARD J. SPERBER
BY H. C. Meuston
ATTORNEY

Oct. 27, 1953

E. J. SPERBER

RECORD CHANGER 2,657,061

Filed April 28, 1950

7 Sheets-Sheet 6

INVENTOR
EDWARD J. SPERBER
BY H. C. Newton
ATTORNEY

INVENTOR
EDWARD J. SPERBER
BY H. O. Newton
ATTORNEY

Patented Oct. 27, 1953 2,657,061

UNITED STATES PATENT OFFICE 2,657,061

RECORD CHANGER

Edward J. Sperber, Philadelphia, Pa., assignor to Radio Corporation of America, a corporation of Delaware Application April 28, 1950, Serial No. 158,882

11 Claims. (Cl. 274—10)

This invention relates to automatic phonograph apparatus. In particular this invention relates to the automatic record-changer apparatus adapted to be supplied with a group of disc-type records as desired for automatic playing. The recordings on the supplied records are consecutively and automatically, played or reproduced without any further assistance from an operator.

Automatic record changers involve relatively complicated mechanisms. Although made fairly rugged, automatic record changers have to be carefully handled if they are to be kept in proper operating condition. Certain parts of a record changer, such as the tone arm which is used to hold a pick-up device in operating relation to a record, are especially likely to be damaged by improper handling. The tone arm is usually an elongated member, pivoted near one end and connected to the operating mechanism so that a considerable leverage can be applied to the said mechanism by grasping and moving the free end of the tone arm. It is accordingly very simple for a small child or unskilled person to damage the mechanism by merely pushing the tone arm when its manipulating mechanism restricts its movement. It is also a simple matter to damage the stylus, which projects from the arm, or damage the pick-up itself, by merely raising the tone arm and permitting it to drop again in such a way that the projecting stylus strikes a hard surface.

Record changing phonographs are generally provided with record changers of exposed construction to permit the records to be changed at will with a minimum of effort. Some record changers may be loaded with ten or more records, and it has hitherto been considered essential to have an exposed construction in such apparatus to provide ready access for handling this number of records each of which may be as much as twelve inches in diameter. When exposed, the mechanism of such apparatus is more liable to be damaged in use.

It is, therefore, a principal object of the present invention to provide an improved automatic record changing phonograph, in which the record changer and vulnerable parts thereof are enclosed and protected effectively beyond the range or normal tampering, yet disc-shaped records can be readily loaded, unloaded, and supplied automatically to the reproducing elements at will.

With enclosed record changers it is important that records may readily be loaded as a group for automatic sequential feeding to a reproducing mechanism, and returned from the reproducing mechanism to an unloading position for removal as a group. It is also important that the return to the unloading position is not interfered with by the record feeding mechanism. Furthermore, inasmuch as the records are automatically manipulated to a greater extent than with prior art instruments, it is more important that the record feeding mechanism does not handle the records roughly.

Accordingly, another object of the present invention, is the provision of an improved record feeding mechanism particularly suited for enclosed record changers.

The present invention has for an additional object, the provision of a record feeding mechanism that does not subject record discs to undue wear either at their outer or inner edges.

A further object of this invention, is the provision of an enclosed automatic record changer that reproduces, and can be conveniently loaded with, records of any of two or more standard sizes.

The above as well as still further objects of the invention will more readily be understood from the following description of exemplifications thereof, reference being had to the accompanying drawings, and the scope of the invention is pointed out in the appended claims.

Figures 1, 8:
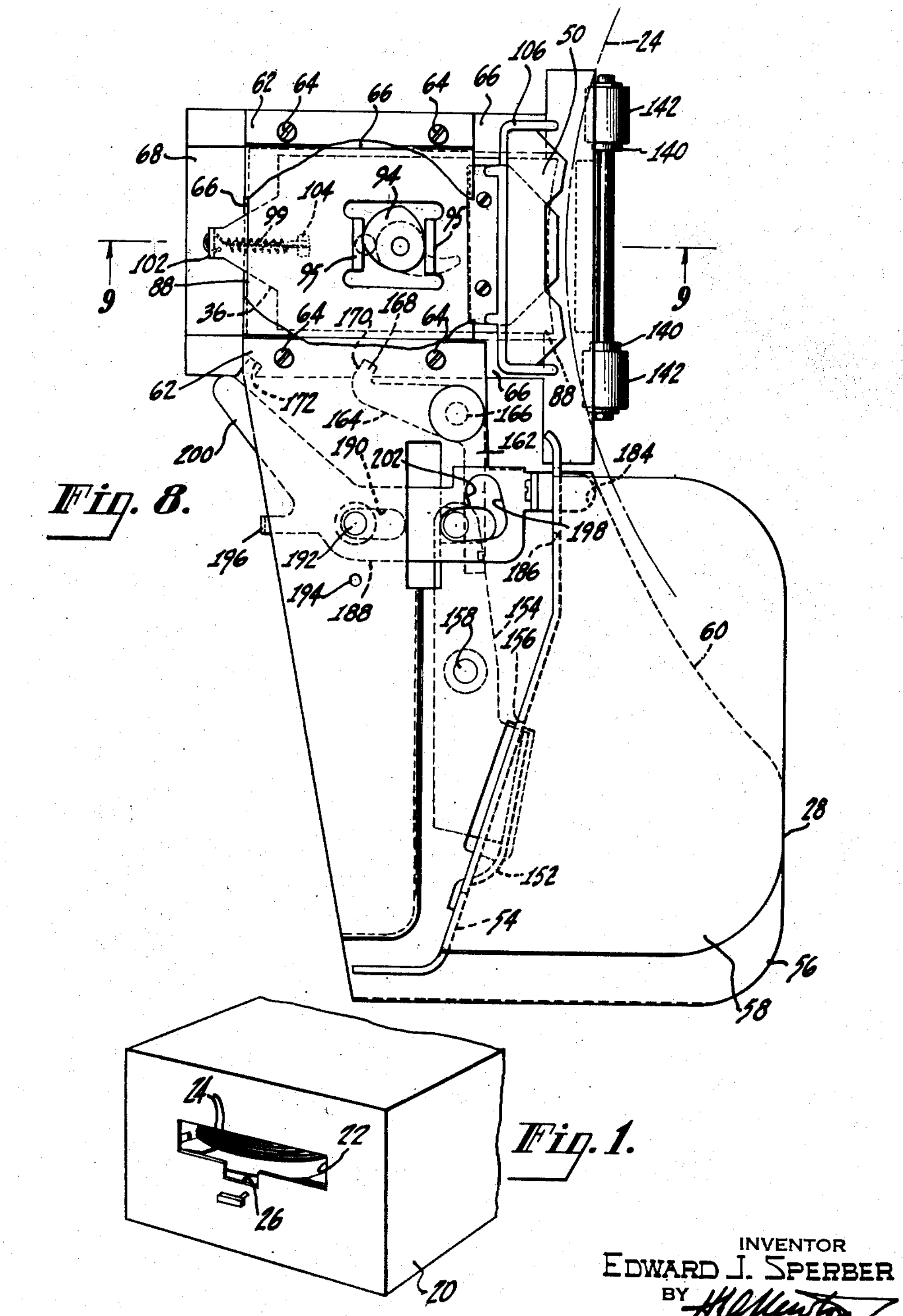
Figure 1 is a perspective view of the frontal portion of a record player provided in accordance with the invention.
Figure 2:
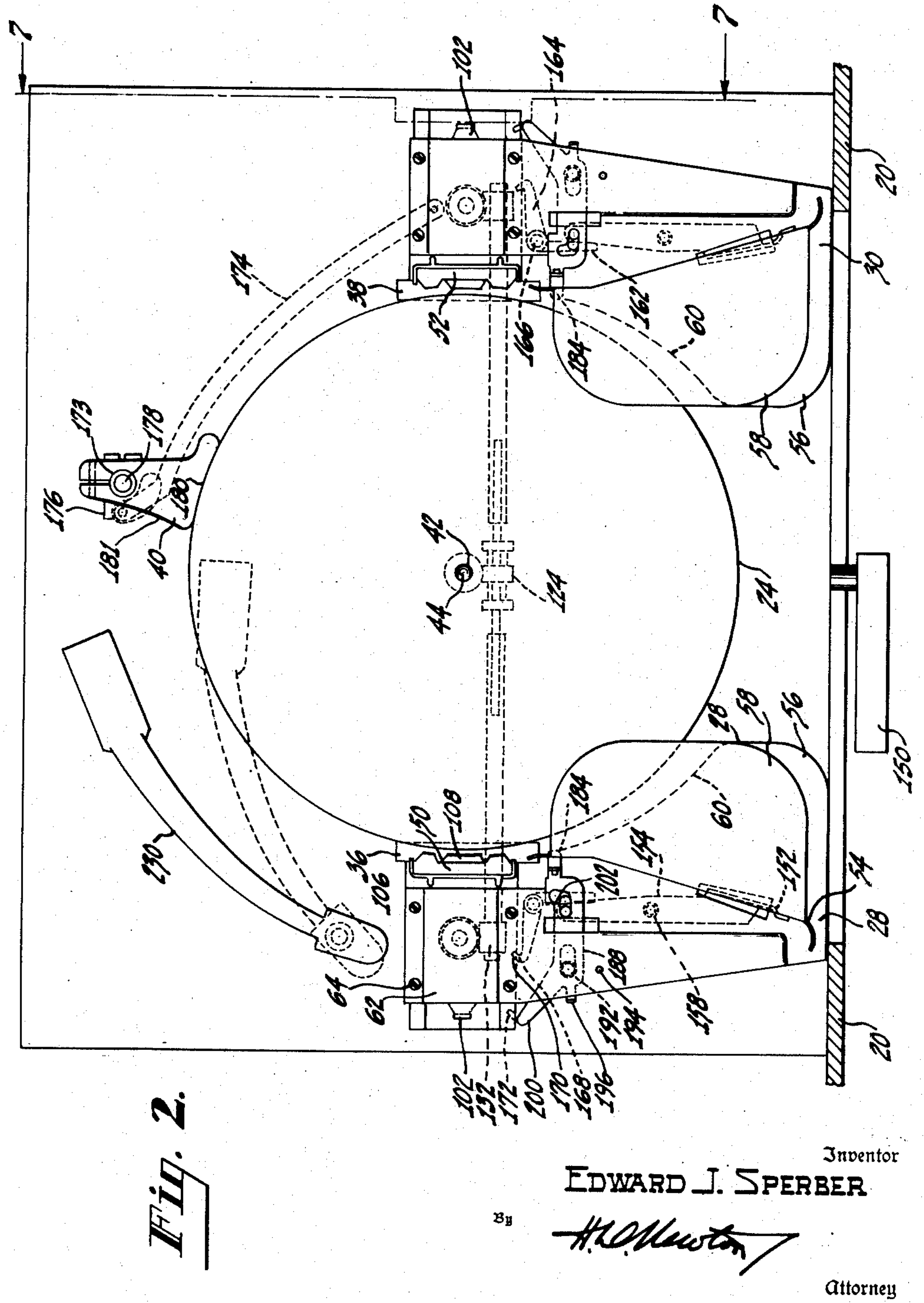
Figure 2 is a top view of the record changer or operating mechanism of the apparatus of Figure 1, with parts of the housing broken away and a record in the feeding position, illustrating a preferred embodiment of the invention.
Figure 3:
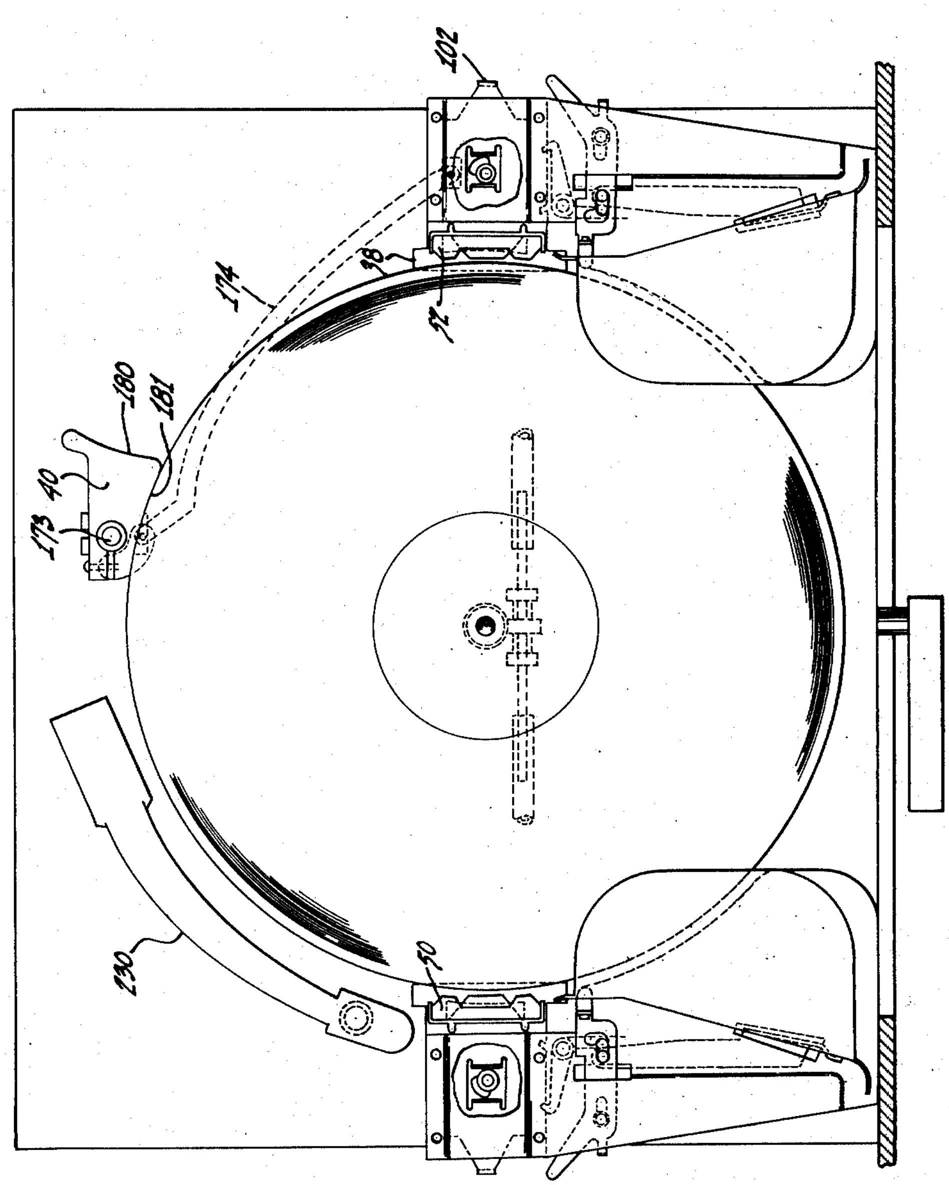
Figure 3 is a top view of the apparatus of Figure 2, but showing portions of the mechanism shifted for a different condition of operation.
Figures 4, 4A, 5, 6, 7:
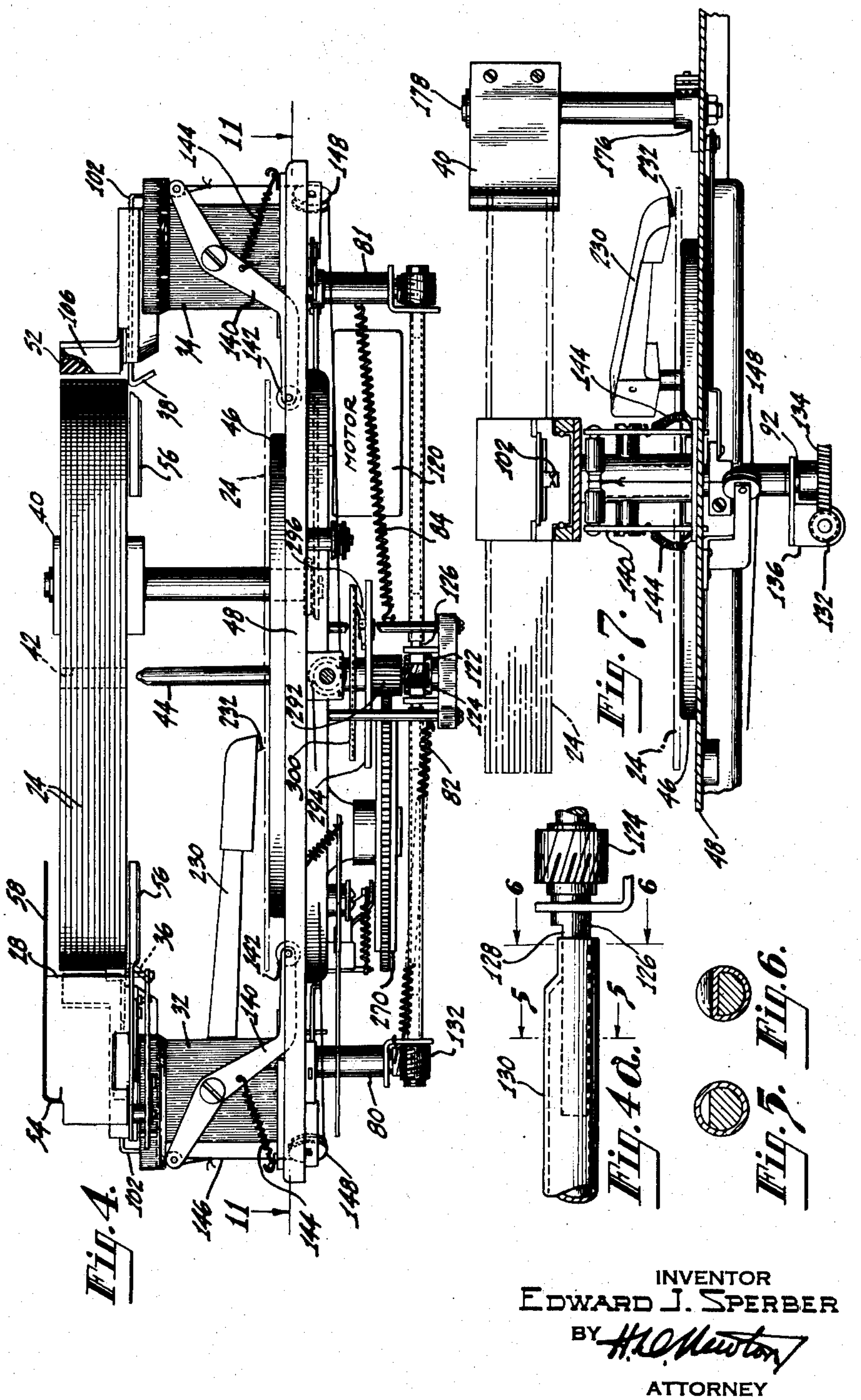
Figure 4 is a front view in elevation, and partly in section, of the record changer mechanism of Figures 2 and 3 with certain portions broken away showing further details of the invention.
Figure 9:
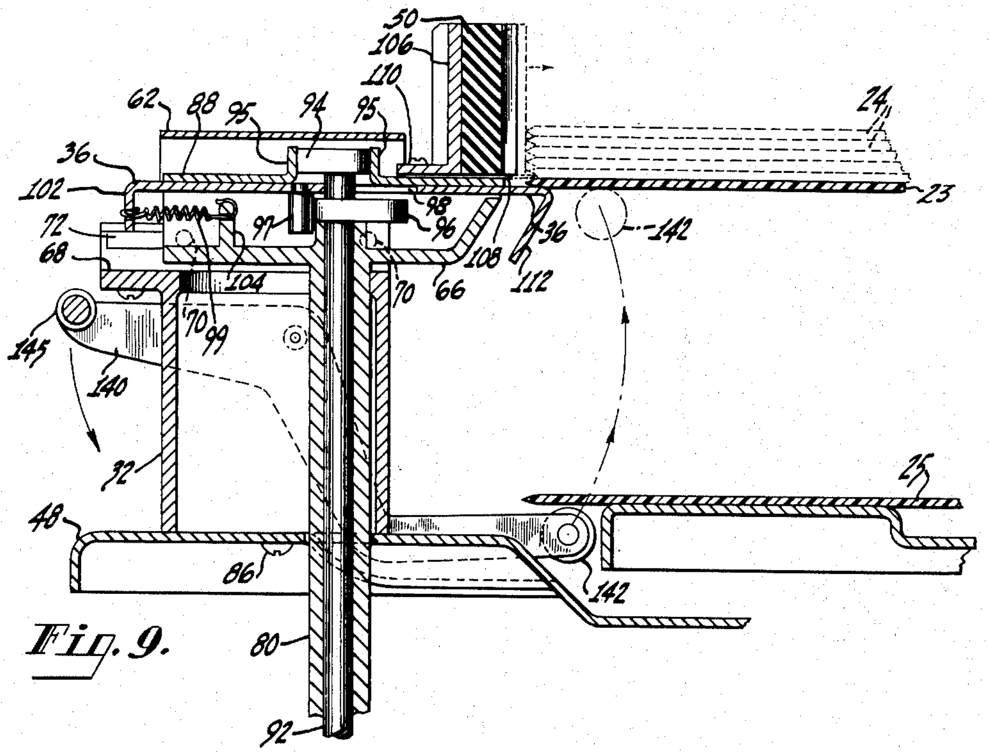

Figure 4*a* is an enlarged detail view of a portion of a record feed mechanism shown in Figure 4;

Figures 5 and 6 are sectional views taken respectively along lines 5—5 and 6—6 of Figure 4*a*;

Figure 7 is a side view in elevation, and partly in section of the apparatus, as shown in Figure 4, the section being taken on the line 7—7 as shown in Figure 2;

Figure 8 is an enlarged top view of a record support portion of the mechanism of Figures 2, 3 and 4, parts being broken away to show some of the lower elements;

Figure 9 is a sectional side view of the record-feeding mechanism of Figure 8, taken along line 9—9 and showing records in the feeding position as well as on the turntable.

Figure 10:
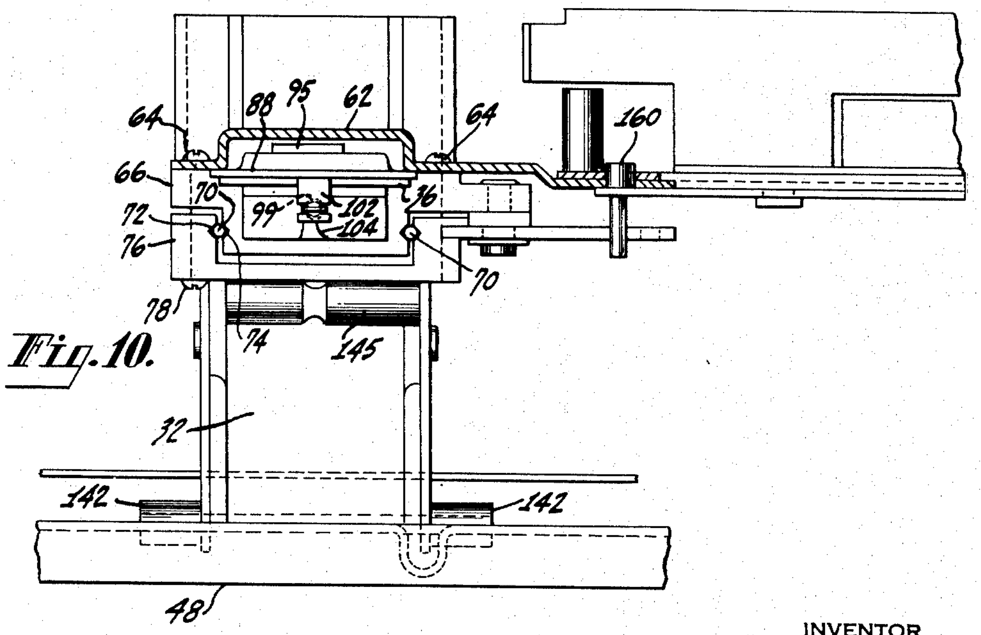
Figure 11:
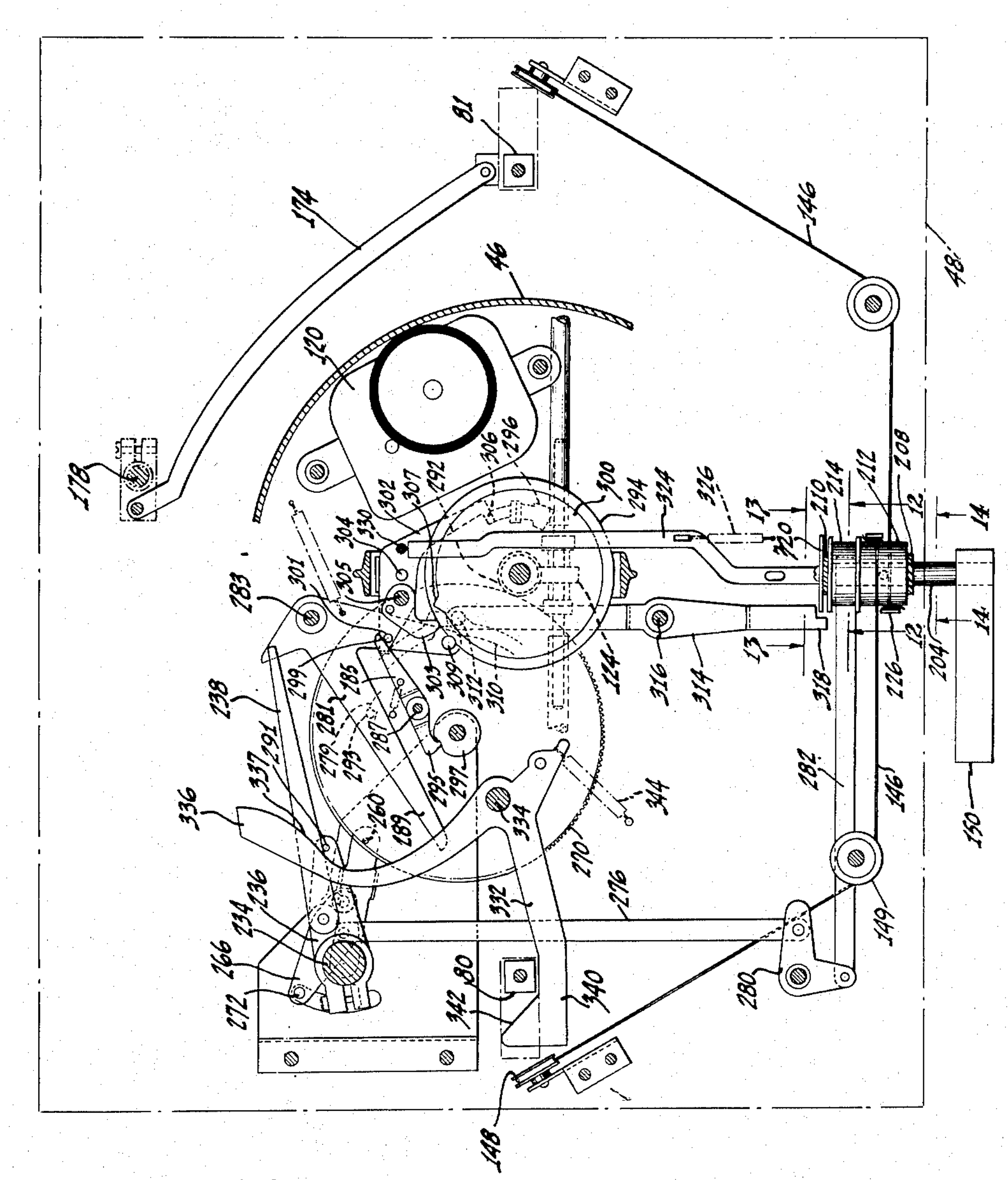
Figure 15:
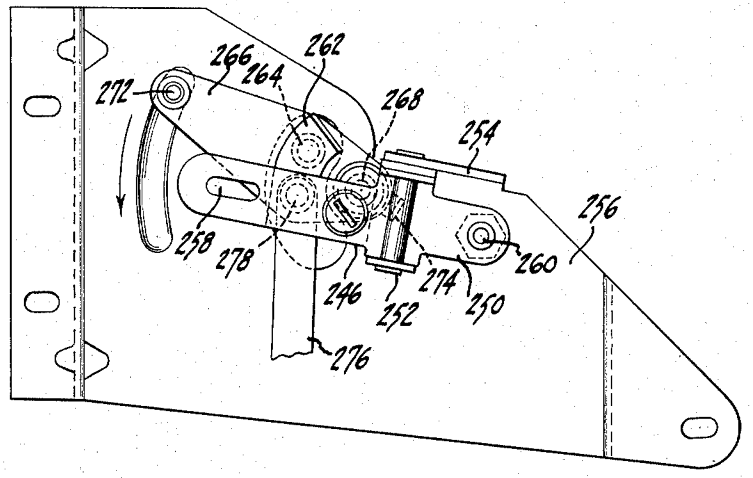
Figure 16:
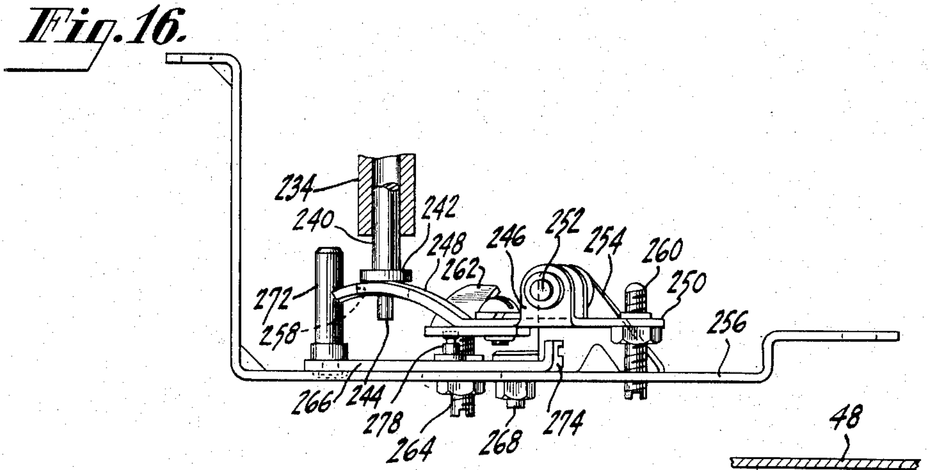
Figure 14:
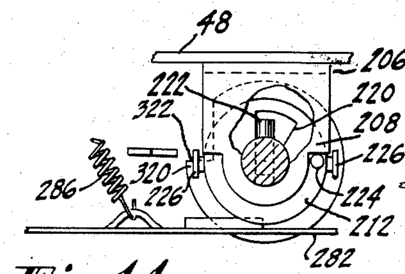
Figure 12:
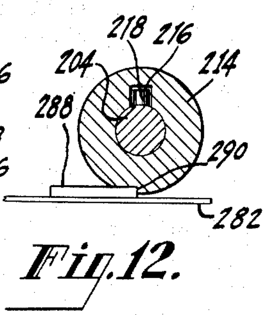
Figure 13:
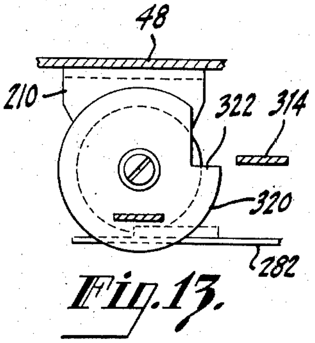

Figure 10 is an end view of the mechanism shown in Figures 8 and 9;

Figure 11 is a plan view, partly in section, of the apparatus shown in Figure 4, taken along line 11—11, showing details of construction;

Figures 12, 13 and 14 are sectional views taken respectively along lines 12—12, 13—13 and 14—14, of Figure 11, showing further constructional details;

Figure 15 is an enlarged plan view of a tone arm actuating mechanism with the trip members removed to better show the operation; and Figure 16 is a side view partly in section, of the mechanism of Figure 15.

According to the present invention, a record changer phonograph has an enveloping housing with a slot through which can be passed a stack of phonograph records to be reproduced. Record supporting structure is positioned inside the housing and adjacent the slot for receiving and holding the stack and individually feeding the records automatically to a reproducing mechanism, as by dropping the records onto a turntable having an upstanding spindle. For removing the records, withdrawing structure is arranged to be operated from the exterior of the housing to lift the records from the turntable back to the record supporting structure adjacent the slot. Here the records can be manually grasped through the slot, and removed.

The phonograph apparatus, embodying the present invention, also includes an improved record dropping mechanism which has a set of arms disposed adjacent radial portions of the record supporting structure but normally out of engagement with the records on the structure. The supporting structure is retractible, and the arms are movable from their normal position for gripping the sides of all but the lowermost record. When a record is to be dropped, the arms are moved into gripping position and the supporting structure retracted, causing the lowermost record to fall onto the turntable. The arms may have resilient record gripping portions of rubber for example to provide gentle record engagement.

Referring to the drawings, in which like parts are designated by the same reference characters throughout the various figures, the embodiment of the invention shown includes, as shown more particularly in Figure 1, an external housing 20, which has a frontal slot 22 through which records 24 can be loaded and unloaded. The slot 22 is wide enough to receive the largest records to be reproduced, and is enlarged downwardly at 26 to provide a notch through which an operator may insert his fingers to grasp the records 24 when they are to be removed.

Referring now, more particularly to Figures 2, 3 and 4, adjacent the slot 22, record guides 28, 30 are held within the housing 20 on hollow posts 32, 34 so as to guide the incoming records, by their sides, into proper position on supporting shelves 36, 38 retractibly held on the same posts 32, 34 as shown more clearly in Figures 2 and 4. The guides 28, 30 engage the left and right marginal portions of the record, and an additional aligning stop 40 mounted deeper within the housing serves to locate the innermost position to which records can be inserted.

When the records are inserted in slot 22 as far as stop 40 permits, they are held by the shelves 36, 38 away from the guides 28, 30 and with their center holes 42 directly over a spindle 44. The spindle is secured to a turntable 46 which is rotatably held in any suitable fashion on a motorboard 48. Above the shelves 36, 38 are upstanding resilient grip blocks 50, 52 preferably of elastomeric material such as rubber, which are normally not engaged with the side edges of the stacked records, but limit side movements of these records to an amount small enough for assuring that a record when dropped will still have its central opening 42 received over the spindle 44.

The side guides 28, 30 provide record guideways of generally channel-shaped section having a side wall 54, corresponding to the web of the channel, a floor 56 and roof 58 corresponding to the flange of the channel. The outer ends of the guides adjacent the slot 22 are flared outwardly to provide rounded record receiving and guiding surfaces. To clear the records held on shelves 36, 38, the floors are cut away as shown at 60.

The phonograph apparatus of the invention can be used for reproducing records 24 of any predetermined size or outer diameter. In the embodiment illustrated, the apparatus can be used with records of two or more different sizes. For this purpose the side guides 28, 30 are laterally slidable on their posts 32, 34. As shown more clearly in Figures 4, 9 and 10 the guide floors 56 extend laterally outwardly as well as rearwardly, and the rear sections 62 are each held as by screws 64 to a carriage 66 slidable in a raceway 68 provided at the top of each post 32, 34. To reduce friction each carriage 66 is shown as slidable on ball bearings 70 held in grooves 72 on the raceway and in opposed grooves 74 on the carriage. For convenience in assembly an upstanding wall 76 of the raceway is detachably held in place by screws 78.

The carriages 66, 67 have depending extensions 80, 81 which penetrate through the respective posts 32, 34, and the motorboard 48. By means of springs 82, 84, suitably secured as indicated in Figure 4, the carriages are biased toward each other so that they are normally held in their innermost positions as shown in Figures 2, 4, 8 and 9. Screws 86, the shanks of which pass through perforations in the motorboard and fit within threaded openings at the lower edge of posts 32, 34 fix the posts to the motorboard.

The carriages 66, 67 are also generally channel-shaped with the channels facing upwardly, as shown in Figure 10. The retractible support shelves 36, 38 are slidably held in these channels, and above the shelves, the channels also carry grip plates 88, 89 which are slidable independently of the support shelves.

The support shelves and grip plates control the dropping of the records onto the turntable. This operation is effected by cam shafts 92 which pass through the hollow extensions 80, 81 and carry cam members. On each cam shaft there is a grip-plate-operating cam member 94 closely fitting between flanges 95 struck up from the grip plate, and a shelf-actuating cam member 96. Each shelf 36 is shown as notched at 98, and carries adjacent the notch, a cam-following pin 97 held against cam member 96 by a spring 99 hooked between a tail 102 on the arm and a suitable wall 104 formed in the carriage. The cam members 94, 96 are suitably fixed to the cam shaft 92 as by set screws (not shown).

Each grip plate 88, 89 carries at its inner edge an upstanding bracket 106 and a thin horizontally projecting blade 108 both of which may be fastened in place together by means of suitably anchored screws 110. To the inner faces of the respective brackets 106 are secured the soft rubber blocks 50, 52 which are preferably of gum rubber or other highly resilient composition. Both the grip 50 and the blade 108 extend out to define a record engaging arc generally concentric with the arcuate edges of the records 24. The shelves 36, 38 carry depending flanges 112 which are bent outwardly to act as camming surfaces. Records moving upwardly against the flanges 112 will thereby cam the shelves out of the way and latch themselves above the shelves.

To raise the records from the turntable, a pair of elevator levers 140 are pivotally mounted on the front and back walls of each post 32, 34. The inner ends of each pair of levers carry record-engaging rollers 142 which in normal position are held by springs 144 just below the outer portions of the records on the turntable 46. The outer ends of each pair of levers are connected by a spacer 145 to which is secured an operating cable 146 threaded over grooved rollers 148, 149 (see Figure 11) for operation by an elevator knob 150 mounted externally of the housing.

The cam shafts 92 are driven by any suitable means such as the motor 120 used to rotate the turntable. As shown in Figures 4, 4*a*, 5, 6 and 7 the spindle 44 projects downwardly below the motorboard, and near its lower end it carries a gear 122 in mesh with a gear 124 on a horizontally disposed counter-shaft 126 having fixed pivots suitably provided. The ends of the counter-shaft 126 are provided with flats 128 to make them non-circular, and slidably receive corresponding shaped sleeve shafts 130. The outer ends of each sleeve shaft carries a gear 132 held in mesh with a gear 134 fixed to the lower portion of the corresponding cam shaft 92. The engagement between gears 132 and 134 is provided by an angle bracket 136 having one arm secured to the extensions 80 that house the cam shafts, and the other arm rotatably received in a retaining groove provided in the sleeve shaft itself or between the terminal gear 132 and a shoulder on the shaft.

The automatic record changing operation is best explained in connection with Figure 9. In this view is shown a stack of records 24 loaded in feeding position, the lowermost record 23 of this stack being in full lines and the remainder being represented by dash lines. The outer edges of the records which are normally chamfered at top and bottom, are shown somewhat exaggerated to more clearly illustrate the record feeding principles.

Blade 108 is positioned above the top of shelf 36 at the level of the groove defined by the adjacent chamfers of the bottom record 23 and the record directly over it. Grip member 50 extends upwardly from the top of blade 108 to a height sufficient for engaging all the records that can be stacked above the lowermost one 23.

When a record changing cycle is taking place, cam shafts 92 are rotated, carrying the cam members 94, 96 around for one complete revolution. The members 94, 96 are so shaped that at the beginning of the revolution the grip plates 88 are forced into gripping engagement with the record stack 24 before the shelves 36, 38 are appreciably moved. Grip block 50 and blade 108 are shown in record gripping position by dash lines. In this position the blade 108 is held above the chamfered edge of lowermost record 23 but below the chamfered edge of the record above it. At the same time, the block 50 resiliently but firmly grips the outer edges of all the records in the stack 24 except the lowermost. This engagement combination provides a secure hold on all the stacked records above the lowermost which continues to rest on the shelves 36, 38.

Further rotation of the cam members then causes the shelves 36, 38 to retract to the point where lowermost record 23 is no longer supported and drops over the turntable spindle onto the turntable to the position shown at 25. The other records of the stack 24 continue to be held between the grip blocks 50, 52 and above the blades 108. After the record 23 has dropped rotation of the cam members causes the shelves 36, 38 to return to the record supporting position shown in Figure 9, following which the grip plates 88 are retracted permitting the remainder of stack 24 to drop onto the shelves. The change cycle is now complete, and the apparatus is ready for the next change cycle, when another record is to be dropped over record 25 on the turntable.

A feature of the invention is the gentle handling of the records by the record-changing mechanism. The resilient grip blocks 50, 52 are soft enough to assure that the record edges are not damaged in any way. The blades 108 need not be used to slice into and lift the record stack, or even to contact the records. They merely guard against accidental feeding of more than one record at a time, as for example when the record immediately above the lowermost record of the stack 23 has a diameter slightly smaller than standard and is not sufficiently well gripped by the blocks 50, 52. This safeguarding feature is provided by simply locating the blades, so that should the lowest gripped record begin to fall, its edges will be caught by the blades and it will not drop below the level of shelves 36, 38. If any or all of the other gripped records also begin to fall prematurely, they will also be stopped before they interfere with the record changing. By keeping the blades 108 normally out of record gripping engagement it is unnecessary to make them adjustable to provide for the usual range in record thickness variation.

The only automatic handling to which the records are normally subjected in the apparatus of the invention, is gripping by the blocks 50, 52 contact with the support shelves 36 onto which they may be dropped a distance equal to the thickness of one record, and dropping engagement with the turntable top which is suitably cushioned (not shown) in the conventional manner, or with other records on the turntable. Although the free fall of a record onto the turntable is an appreciable drop especially for the heavier records, the pocketing of air below the falling record also helps to cushion the landing impact.

To control the positions of the guides 28, 30 for properly guiding records of different sizes, the guides are arranged to be automatically slid outwardly with their carriages 66, 67 on raceways 68. Near the outer edge of each guide wall 54 there is a cut out 156 through which projects a sensing nose 152 of a sensing lever 154. The sensing lever is pivoted at 158 to the lateral extension of guide floor 56 and has a rearwardly directed arm that carries a pin 160 projecting both above and below the floor 56. The lower portion of pin 160 cooperates with a forwardly projecting arm 162 of a catch lever 164 pivoted at 166 to a suitably projecting ear on the side of the carriages 66, 67.

The catch levers 164 each have a claw 168 which is biased toward the nearby edge of the post raceways 68 by a spring (not shown) and engages with either one of two sockets, 170, 172 cut in this edge. At the same time the catch biasing spring holds catch arm 162 against the pin 160 of sensing lever 154, and keeps the sensing nose 152 projecting into the record guideway in the path of the incoming records.

The guides are normally held in the position shown in Figures 2 and 8 by means of the post biasing springs 82, 84 the claws 168 being caught in notches 170. In this position the record-receiving throat between guide walls 54, 54 is wide enough at its narrowest point to admit the smallest records to be reproduced. The sensing noses 154 are at least as far apart as the narrowest part of the throat so that when the smallest records are loaded, they do not push out the sensing noses, but are instead guided into the throat by these noses. However, when the larger sized records are passed through slot 22 and into the guideways of guides 28, 30 they first engage and push outwardly on the sensing noses 152 which are too close together to permit their free passage. This pivots the sensing levers 154, causing their pins 160 to bring the catch lever claws 168 out of the sockets 170. Further travel of the records within the guideways brings the record edges against the tapering guide walls 54 camming the guides outwardly. This continues until the guides are far enough apart to pass the widest parts of the records, when the catches 168 will automatically drop into notches, 172. Inasmuch as the records will then have moved beyond the noses 152, the catch levers are freed to again latch the guides against their posts 32, 34.

At the same time the stop 40 is arranged to automatically adjust the inward record limit position for the larger sized records. As shown in Figures 2, 3, 4 and 7 the stop 40 is held on a sleeve 173 pivoted to a vertical shaft 178 secured to the motorboard. The right hand carriage extension 81 is connected through a link 174 to a block 176 clamped on the sleeve 173 below the motorboard. The link 174 is pivoted to the block 176 as well as to a suitable portion of the extension 81 or a member fixed to the extension. Stop 40 has one face 180 so placed with respect to its pivot 178 as to cooperate for centering the smallest size records and another face 181 which is rotated into corresponding record limiting position when the larger records are inserted, as shown in Figure 3. The linkage to carriage extension 81 supplies the automatic stop adjustment.

The embodiment of the invention shown in the figures is also provided with an automatic record guide return arrangement. A trip bar 184 penetrating through an opening 186 in the rear portion of the guide walls 54 is secured to a plate 188 slidably held at a laterally-directed notch 190 by a pin 192 fixed to the extension of guide floor 56. The plate 188 is accordingly transversely slidable toward or away from the record guideway, and is biased toward the guideway as by a spring (not shown) hooked in a hole 194 in the floor extension and to a depending lug 196 on the plate. By reason of the oversize depth of openings 186 the plates can also pivot somewhat around pin 192. A generally L-shaped notch 198 in the plates 188 surrounds sensing lever pin 160 as shown. With the guides in their contracted position as shown in Figures 2, 4 and 8, the pivoting of plate 188 is limited by the edges of the transversely extending leg of notch 198 as well as by a tail 200 on the plate which engages the side of raceway 68.

The guides 28, 30 remain in their more separate position (Figure 3) so long as the larger records stay in the apparatus. When these records are withdrawn however, their edges engage the trip bars 184 pushing the bars apart and at the same time urging them forwardly in the direction of record withdrawal. The separating movement of the bars carry the plates 188 laterally outwardly causing the lateral legs of notches 198 to move past the sensing lever pins 160 freeing the plates for pivoting as far as permitted by the rearwardly directed legs of these notches. Each plate is accordingly pivoted by the records being withdrawn and carries the edge 202 of the notch 198 forwardly against the side of pin 160.

As soon as the records being withdrawn clear a bar 184, its plate spring causes the corresponding plate 188 to be moved laterally inwardly thereby causing notch edge 202 to trip pin 160 and effect the retraction of catch claw 168 from the outer socket 172. This permits the carriages as well as guides 28, 30 to be returned to the smaller record receiving position by the carriage return springs 82, 84. During this return the tail 200 is cammed forwardly by the side of the raceway 68, pivoting back the plate 188 with its bar 184 to the normal position shown in Figure 8, thereby releasing the sensing lever pin 160 so that this lever also returns to the normal position shown in this figure.

The record elevating knob 150 and its connection to the elevating levers are more clearly shown in Figure 11. The knob is fixed to a control shaft 204 slidably and rotatably mounted in bracket 206 (see Figures 13 and 14) suitably fixed to the underside of motorboard 48. The bracket is in the shape of an inverted U having two depending arms 208, 210 through which the shaft 204 passes. Between these arms two drums 212, 214 are slidably held around the shaft 204, as by the engagement of an internal radial slot in each drum with a suitably positioned pin projecting out from the shaft.

In Figure 12 the slot for drum 214 is shown at 216 as closely fitting with the cooperating shaft pin 218. Drum 212 however has a limited range of rotation with respect to shaft 204, as by making its slot 220 correspondingly wider than its pin 222 in the manner indicated in Figure 14.

The rotation of shaft 204 is limited by a stop pin 224 held by drum 212 and moving along an arcuately shaped end of the adjacent bracket arm 208. Studs 226 on drum 212 have the elevating cables 146 secured to them.

The elevating handle 150 is normally in the position shown in Figures 1 and 11 under the influence of the lifting lever springs 144 as well as the weight of the handle itself. To lift the records from the turntable, the handle is rotated in a clockwise direction as seen in Figure 1. Drum 214 rotates simultaneously with the handle but the rotation of drum 212 is delayed somewhat by reason of the extra width of its drive slot 220. When drum 212 does begin to turn it pulls elevating cables 146 actuating the tilting of lifting levers 140 and elevating the records from the turntable onto the support shelves 36, 38.

The usual tone arm 230 with pick-up stylus 232 is shown as provided for reproducing the recordings. In accordance with the invention, the record elevating structure is arranged to assure that the tone arm is retracted away from over the records when they are elevated.

The tone arm is secured to a hollow shaft 234 which projects vertically below motorboard 48. Clamped to the lower section of shaft 234 is a bracket 236 carrying a long trip arm 238 which cooperates to trip the record changing mechanism and initiate the changing of a record. The specific manner of tripping forms no part of the present invention and any convenient arrangement may be used.

Through the hollow tone arm shaft 234 there is positioned a lift pin 240 the upper end of which can be brought into engagement with the arm itself to tilt it up on a suitably provided horizontal pivot and bring the stylus away from any record on the turntable. At the lower portion of the lift pin 240 a collar 242 and a reduced extension 244 are provided for engagement with a lift lever 246 which in turn cooperates with the automatic changer mechanism. The lift lever has two arms 248, 250 and is pivoted on a pin 252 fixed in horizontal position to a flange 254 of a sub-chassis 256 conveniently secured to the motorboard. One lift lever arm 248 is slotted at 258 to receive the reduced lift pin extension 244, the other arm 250 carrying an adjustably positioned lift screw 260 for engagement by a lift mechanism, which in the form shown in Figure 11 includes a cycling cam gear 270 having a cam-shaped lower surface.

The lift lever 246 also carries an inclined cam lug 262 the underside of which is shaped to engage a second lift screw 264. This lift screw is held by an actuator plate 266 pivoted to the sub-chassis 256 at 268 and carrying a retractor post 272 positioned to engage a side of the tone arm bracket 236 upon rotation of the plate. The plate is biased in the clockwise direction as seen in Figure 15, as by a spring (not shown) hooked between a suitable fixed point and a lug 274 bent up from the plate.

For operating the actuator plate, a link 276 is connected to a stud 278 on the plate and also to one arm of a bell crank 280 pivoted to the motorboard as shown in Figure 11. The other arm of this crank pivotally carries a longitudinally slidable bar 282 held up against the underside of drum 214, as by spring 286. A block 288 secured on the bar 282 has one end received in a notch 290 cut in the corresponding portion of the surface of this drum, so that drum rotation causes the bar 282 to slide to the left as seen in Figures 11, 12 and 14, thereby pulling the actuator plate 266 around in counterclockwise direction.

It will accordingly be seen that when the handle 150 is rotated to effect a record elevating operation, the cables 146 secured to drum 212 are not pulled till the drum 214 has rotated an amount sufficient to pull forward the actuator plate 260. The initial movement of this plate brings lift screw 264 against cam lug 262 to raise the tone arm, after which post 272 engages bracket 236 turning the tone arm away from over the records. Further rotation of handle 150 will then bring drive pin 222 against the right side of slot 220 as seen in Figure 14, causing the cables 146 to be pulled to lift the records, as explained above.

To prevent the lifting of the records during a record changing cycle when the support shelves may be retracted or other records may be firmly gripped in blocking position above the shelves by grip members 110, the cycling mechanism is arranged to disable the handle 150. As shown in Figures 4 and 11, the cycling cam gear 270 is in mesh with and is driven by a gear 292 journalled on the spindle 44 and fixed to a driven clutch disc 294. A pawl type clutch action is provided by a pawl 296 pivoted to plate 294 and so weighted as to have one end biased upward to engage in any of a series of recesses formed in the under surface of a drive disc 300 fixed to the spindle. A blocking arm 302 pivoted at 304 carries a blade 306 which can be brought between the driving and driven discs 300, 294 to disengage the clutch pawl 296 from the recesses in disc 300 as the pawl is carried around the spindle. The clutch is disengaged when the apparatus is set for record reproduction, and is engaged only during the change cycle. Cam gear 270 is rotated one turn during the cycle and effects the tone arm movement required during the changing, as well as a locking in of the change cycle until it has been completed. Gear 122 is fixed to gear 292 and also rotates only when the clutch is engaged, thereby effecting the record feeding operations during the change cycle, as explained above.

Although any suitable cycling mechanism can be used, the one shown in Figure 11 includes a tone-arm-retracting lever 281 pivoted at 283 and a lock-in lever 285 pivoted at 287. Retracting lever 281 has an arm 289 which can be brought into engagement with the bracket 236 as by means of a post 291 carried by this bracket in the pivotal path of arm 289. An actuating pin 293 held by lever 281 cooperates with a suitable cam groove 279 in cam gear 270 to bring about properly timed tone arm retraction during the change cycle.

Lock-in lever 285 cooperates at a follower portion 295 with a notched cam 297 held for rotation with cam gear 270. A control portion 299 of the lock-in lever is positioned so that it can be brought into the path of a pin 301 on pivoted blocking arm 302.

A cycle-stopping finger 303 is pivoted at 305 on blocking arm 302 and biased as by a spring (not shown) in counterclockwise direction, as seen in Figure 11, to cooperate with a cam lobe 307 on the clutch disc 300.

When a record is being reproduced, the trip arm 238 follows the clockwise rotation of the tone arm to the inner end of the record. At or near this end, the trip arm 238 will have engaged blocking arm 302 as by means of the pin 301, and pivoted blade 306 out of pawl-blocking position. Clutch engagement thereupon takes place causing driven disc 294 to be rotated by disc 300, and driving cam gear 270. In its rotation, cam gear 270 operates lift screw 260 to elevate the tone arm, and actuates retracting lever 281 to swing the tone arm aside. At the same time lock-in lever 285 is lifted out of the notch in cam 297 and is interposed in the path of pin 299 to prevent the return of blocking arm 302 to the clutch disengaging position. Actuation of finger 303 by lobe 307 during this time will only pivot the finger against its bias without pivoting the blocking arm.

In the meantime, the record feeding operation is being effected by gear 122. After a record is dropped, the retracting arm is withdrawn from against bracket 236 leaving the tone arm in position for suitable landing engagement with the outer end portion of a record groove. The lift screw 260 is then released lowering the tone arm to record reproducing position, and the lock-in lever is carried back into the notch of cam 297. This permits the next rotation of lobe 307 to actuate the blocking arm 302 through finger 303, moving it back to clutch disengaging position and terminating the record changing cycle. Disc 294 may have a peripheral notch receiving a stud 309 on the retracting arm to more positively hold the cycling mechanism against movement during the time cycling is not called for.

Cam gear 270 also carries a cam groove 310 in which is received a cam following pin 312 held by a lock lever suitably pivoted at 316. A forwardly projecting tongue 318 of this lever is positioned adjacent a stop disc 320 fixed to the backend of the control shaft 204. The edge of the disc is notched as shown in Figures 13 and 14 to provide a notch shoulder 322 alongside the tongue 318 when the handle 150 is in the non-operated position shown in Figure 11.

The cam groove 310 has an offset into which pin 312 is moved laterally when a change cycle is completed. This brings the tongue 318 into the position shown in Figure 11, away from notch shoulder 322. The lifting handle 150 can accordingly be operated at will. During the change cycle however, the cam 310 pulls the pin 312 to the left as seen in this figure, moving the tongue 318 over the shoulder and preventing rotation of the lifting handle.

Another feature of the invention is the incorporation of an additional control function in the lifting handle. In the construction shown, the shaft 204 is longitudinally slidable in the bracket arms 208, 210, by reason of the pin and slot connection to the drums 212, 214. An elongated reject slide 324 is suitably held for longitudinal movement and is biased forwardly against the stop disc 320 as by spring 325. The rear portion of slide 324 is positioned directly in front of a stud 330 carried by the blocking arm 302.

The handle can accordingly be pushed inwardly whenever desired and when so pushed will tilt back blocking arm 302 permitting the clutch pawl 296 to engage the clutch disc 300 and start a record change cycle.

For adjusting the position of tone arm 230 when it is automatically lowered onto differently sized records, an interlink lever 332 is pivoted at 334. An arm 336 of this lever has an edge 337 suitably shaped to coact with post 291 fixed to the tone arm bracket 236. Another arm 340 of this lever has a cam edge 342 that is biased into engagement with the side of the laterally slidable carriage extension 80 by spring 344.

In the position shown in Figure 11, the apparatus is set to reproduce the smaller sized records. Edge 337 acts to return the tone arm to the proper landing position no matter how much it is turned away by cam gear 270 in the earliest parts of a change cycle. With larger sized records the extension 80 is positioned further away from pivot 334, thereby engaging cam edge 342 to fix the arm return position of lever arm 336 further away from the turntable spindle.

The apparatus described above is intended for automatically reproducing records of two different diameters, but in accordance with the invention can be modified for use with records of three or more different diameters. For this purpose all that is needed are suitable changes in the mechanism for sliding the carriages 66, 67 between the corresponding number of positions.

The only operating control not shown in the described apparatus is an on-off switch or the like. This can be provided at any desired portion of the electric supply circuit to the turntable motor 120, or can be arranged to be automatically operated by a door (not shown) provided on the housing 20 to cover the slot 22 when the phonograph is in use. The door operated switch can be connected to energize the apparatus only when the door is closed, thereby further reducing its susceptability to tampering. An amplifier can also be included in the housing 20 if desired.

Where differently sized records are reproduced with different turntable speeds, the apparatus can be provided with a multi-speed turntable driving unit of any suitable construction, and can be arranged to automatically shift the turntable driving speed to match the particular record size. Thus where 7 inch records are to be reproduced at 45 turntable revolutions per minute, and 12 inch records at 33⅓ turntable revolutions per minute, one of the carriages can be connected to automatically shift the turntable speed as it moves laterally to the appropriate record guiding positions.

The automatic phonograph described above is readily equipped with a last record stop. Thus by merely arranging for the lever 332 to be automatically latched in the fully retracted position into which it is moved by retracting lever 281, the tone arm may be controlled so that after the last record of a sequence, the final tone arm descent at the end of a record changing cycle is in a remote position away from any of its normal landing positions. The latching mechanism can be provided with a control arm which is operated by the dropping of a record from the shelves 36, 38 to release the latch and permit the tone arm to be returned by lever 332 to its normal landing, when reproducing all but the last record of a stack. At the remote position an on-off switch may be mounted and connected so that it is engaged by the free end of the descending tone arm and is thereby operated to automatically shut off the power supply circuit for the phonograph. The reject slide 324 is conveniently connected to also release the latch so that the tone arm is pulled away from the on-off switch at the above remote position, when the handle 150 is pushed inwardly. This will energize the phonograph and at the same time set it for a record changing cycle.

If desired other types of last record stops may be used, as for example the one shown in the U. S. Patent No. 2,295,092, granted September 8, 1942, to F. J. Offen.

While several exemplifications of the invention have been indicated and described above, it will be apparent to those skilled in the art that other modifications may be made without departing from the scope of the invention, as set forth in the appended claims.

What is claimed is:

1. In a record feeding mechanism for automatic drop-type phonographs: retractable supporting structure for supporting a stack of phonograph disc records to be gravity fed and having record supporting portions disposed radially with respect to the center of the stack of records; a set of movable arms disposed adjacent said radial record supporting portions of said structure and normally out of holding engagement with records on the supporting structure, said arms being operable upon being moved from their normal positions to engage and grip the edges of all but the lowermost record of the stack; said arms have yieldably resilient record engaging portions for securely holding and supporting the upper records of the stack without subjecting the records to excessive stresses, and actuating elements for said arms and said structure effecting the movement of said arms into gripping engagement with the edges of all but the lowermost record of the stack and also effecting the retraction of said supporting structure.

2. In an automatic phonograph apparatus: a housing having a slot for admitting a stack of phonograph disc records of the type having a control spindle hole; retractable supporting structure positioned inside the housing and adjacent said slot for receiving and automatically supporting a stack of records admitted through the slot; retractable grip elements adjacent said supporting structure adapted to be moved toward said stack of records in a record change cycle to peripherally engage and hold all the records of the stack except the lowermost record; reproducing elements including rotatable turntable mechanism and a central spindle positioned inside the housing and below the supporting structure for automatically reproducing the recordings on individual records in sequence; said reproducing elements also including automatic record feeding mechanism operable automatically at the completion of the playing of a record to effect the movement of said grip elements to their record holding positions, said record feeding mechanism also effecting the retraction of said supporting structure, whereby said lowermost record is permitted to drop along said spindle and onto said turntable to be played; and withdrawing structure connected for lifting all the records up from the turntable and spindle and back onto the supporting structure to place the records adjacent said slot for removal through the slot.

3. The combination as defined by claim 2, in which the supporting structure is positioned to hold the records of the stack in generally horizontal planes above the spindle, the slot is on one side of the supporting structure, and the turntable is positioned under the stack for rotation in a generally horizontal plane.

4. The combination as defined by claim 2, in which the supporting structure includes guide elements for guiding a record stack from the slot to a position directly above the turntable with central spindle holes in the records aligned with the spindle.

5. The combination as defined by claim 2, in which the supporting structure is positioned to support the lowermost record of the record stack adjacent the periphery thereof, and is retractable to withdraw from the record supporting position; said supporting structure having portions thereof disposed radially with respect to the axis of said spindle; and the record feeding mechanism includes a set of arms positioned adjacent said radial portions of the supporting structures, said arms being normally out of holding engagement with records on the supporting structure, but being movable from their normal positions for gripping the sides of all but the lowermost record of the stack, and actuating elements connected to bring the arms into gripping engagement and to retract the supporting structure to cause the ungripped lowermost record to drop onto the turntable.

6. The combination as defined by claim 2, in which the supporting structure is in the form of biased, retractable latch elements positioned for supporting the bottom of the record stack, said feeding mechanism operable to hold all but the lowermost record of the supported stack and to retract the latch elements to cause the lowermost record to drop on the turntable, said withdrawing structure being operable to lift records from said turntable and effect the retraction of said latch elements to permit continued upward movement of the records past the top of said spindle and above said latch elements, said latch elements being operable upon lifting of said records thereabove to project inwardly below the lowermost record and support the records adjacent said slot, whereby the records are easily accessible for removal from the housing.

7. The combination as defined by claim 2, in which the reproducing elements include a retractable pick-up device movably held for cooperation with the top surface of the uppermost record on the turntable, and the withdrawing structure is connected for operation to retract the pick-up device away from above the turntable, and then raise records on the turntable back onto the supporting structure.

8. In an automatic phonograph apparatus: a housing having an opening for admitting a stack of phonograph records of the type having a central spindle hole; retractable record supporting structure positioned in relation to said opening for receiving and automatically supporting a stack of records in alignment with said opening; retractable record changing elements in cooperative relation with said supporting structure operable in record change cycles to peripherally engage and hold all the records of the stack except the lowermost record; reproducing elements including rotatable turntable mechanism and a central spindle positioned inside the housing and below the supporting structure for automatically reproducing the recordings on individual records in sequence; said reproducing elements also including automatic record feeding mechanism operable upon movement of said record engaging elements into peripheral engagement with all but the lowermost record of the stack to effect retraction of said supporting structure away from said lowermost record, whereby said lowermost record drops onto said turntable; and withdrawing structure connected for lifting all of the records up from the turntable and back onto the supporting structure to place the records adjacent the opening for removal.

9. In an automatic phonograph: a cabinet having record playing elements mounted inside and of limited access from the outside for automatically reproducing recordings on records with reduced exposure to tampering, said cabinet having a slot for receiving a stack of records to be played; retractable supporting structure inside the cabinet and adjacent said slot for receiving and holding a stack of records passed through the slot; record gripping elements disposed adjacent said supporting structure and in cooperative relation therewith; said record playing elements in a record change cycle controlling movement of said record gripping elements into peripheral engagement with all but the lowermost record of the stack and effecting the withdrawal of said supporting structure to release the lowermost record from the stack for reproduction of said lowermost record; and withdrawal structure having elements operable from outside the cabinet to return the reproduced records to the supporting structure for removal through the slot.

10. In an automatic phonograph apparatus: a housing having a slot for admitting a stack of phonograph disc records of the type having a control spindle hole, said slot being long enough to admit records of different diameters; supporting structure positioned inside the housing and adjacent said slot for receiving and automatically supporting a stack of records admitted through the slot, said supporting structure including guide elements for guiding a record stack from the slot to a position directly above the turntable with central spindle holes in the records aligned with the spindle; retractable grip elements adjacent said supporting structure adapted to be moved toward said stack of records during a record change cycle to peripherally engage and hold the records of the stack above the lowermost record, automatic adjusting elements in said guide structure automatically effecting the radial movement of said grip elements and portions of said supporting structure to accommodate and accurately center records of different diameters inserted in said slot over the spindle; reproducing elements including rotatable turntable mechanism and a central spindle positioned inside the housing and below the supporting structure for automatically reproducing the recordings on individual records in sequence; said reproducing elements also including automatic record feeding mechanism operable automatically at the completion of the playing of a record to effect movement of said grip elements to their record holding positions, means connected with said record feeding mechanism to effect retraction of said supporting structure, whereby the lowermost record is permitted to drop along said spindle and onto said turntable to be played, and withdrawing structure for lifting all the records from the turntable and spindle onto the supporting structure thereby to place the records adjacent said slot for removal through a slot.

11. In an automatic phonograph apparatus, the combination, as defined in claim 10, in which the record feeding mechanism is movable for positioning in operative relation to records of different diameters and the automatic adjusting elements are also connected to automatically control the position of record feeding mechanism and assure the automatic feeding to the turntable of records having the diameters of those guided onto the supporting structure.

EDWARD J. SPERBER.

References Cited in the file of this patent

UNITED STATES PATENTS

| Number | Name | Date |
| --- | --- | --- |
| 2,100,686 | Collaro et al. | Nov. 30, 1937 |
| 2,351,972 | Johnson | June 20, 1944 |
| 2,486,898 | Wennerbo et al. | Nov. 1, 1949 |
| 2,546,136 | Ristau et al. | Mar. 20, 1951 |